(12) United States Patent
Hoff et al.

(10) Patent No.: US 6,360,955 B1
(45) Date of Patent: Mar. 26, 2002

(54) METHOD AND MEANS FOR AUTOMATED VARIABLE HEATER CONTROL FOR AGRICULTURAL UNIT HEATERS

(75) Inventors: Steven J. Hoff, Jewell; Jay D. Harmon, Ames; David Van Utrecht, Moline, all of IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 0 days.

(21) Appl. No.: 09/615,996

(22) Filed: Jul. 14, 2000

Related U.S. Application Data

(60) Provisional application No. 60/144,142, filed on Jul. 16, 1999.

(51) Int. Cl.[7] .............................. G05D 23/00; F24H 3/00
(52) U.S. Cl. ......................... 236/10; 236/51; 236/78 B; 126/166 A
(58) Field of Search ................................. 236/46 R, 51, 236/75, 78 B, 10; 126/116 A, 110 D

(56) References Cited

U.S. PATENT DOCUMENTS

| | | | |
|---|---|---|---|
| 5,477,698 A | * | 12/1995 | Takegawa et al. ......... 236/78 B |
| 5,682,949 A | * | 11/1997 | Ratcliffe et al. .......... 236/51 X |
| 5,805,443 A | * | 9/1998 | Raffray et al. ......... 236/46 R X |
| 5,813,599 A | | 9/1998 | Hoff |

FOREIGN PATENT DOCUMENTS

FR 2590381 * 5/1987 ............... 236/46 R

* cited by examiner

Primary Examiner—William Wayner
(74) Attorney, Agent, or Firm—Zarley, McKee, Thomte, Voorhees & Sease, PLC

(57) ABSTRACT

A space heater for the interior of a building has a support enclosure containing a gas burner and a gas conduit connecting the burner to a source of combustible gas. An electronically controlled proportional valve is located in the gas conduit. A fan and motor assembly are in the enclosure for distributing heated air from the burner when gas is communicated through the conduit and to the burner for combustion. A control system and a PC interface of a PC are located in the support enclosure to receive a data processing card having a predetermined temperature set point relating to temperature conditions within the building. A control means comprises a part of the control system and is connected to the PC to be responsive to temperature sensors in the building to cause or cease ignition of gas at the burner when any of the temperature conditions in the building varied with the predetermined temperature set point to permit the production of heat by the burner to automatically bring the varied temperature conditions in the building back towards the temperature of the predetermined temperature set point.

4 Claims, 4 Drawing Sheets

METHOD AND MEANS FOR AUTOMATED VARIABLE HEATER CONTROL FOR AGRICULTURAL UNIT HEATERS

This application is based upon the applicants' Provisional Application Ser. No. 60/144,142 filed Jul. 16, 1999.

GRANT REFERENCE

Work for this invention was federally funded under IAHEES, Hatch (USDA) Contract No. I0W03140. The government may have certain rights in this invention.

BACKGROUND OF THE INVENTION

Maintaining constant and uniform temperatures in livestock buildings in cold-weather climates can be challenging. A majority of livestock buildings utilize unvented LP-gas space heat, operated with on/off control. A few more sophisticated control systems use a combination of a fan speed control and heater control to more closely monitor and control temperatures during periods of minimum ventilation. In the swine industry, supplemental heat is required in farrowing houses, nurseries, and some styles of finishing buildings. In addition, many new facilities are combining nursery and finishing capabilities into a single unit. These buildings also require supplemental heat, depending on time of year and age of the animal.

Winter ventilation rates are kept at a minimum to reduce the amount of supplemental heat required. Therefore, when supplemental heat is required, indoor temperatures tend to rise rapidly to and above the desired set point. The temperature is then allowed to fall below the set point a set amount before the supplemental heat source is reactivated. This prevents rapid repetitive cycling of the supplemental heat source. Unfortunately, this results in significant differences between the high and low room temperature.

High cyclic temperatures can have an adverse effect on swine growth. Combining lighting patterns with temperature control can affect feed intake and pig growth.

Significant research has been devoted to studying the effects of cold and heat stress. The research indicates that both extremes are detrimental to swine growth and performance. Swine tend to huddle together when cold and spread apart when hot. Observing the swine herd in a confinement building allows the operator to determine an appropriate set point. It is also possible to observe periods of apparent heat and cold stress during the temperature swings due to heater operation. Therefore, excessive temperature variation is detrimental to swine performance, especially for immature animals.

One type of climate control which exists is referred to as "on/off" control. The mode of control is the manner by which a control system makes corrections in response to a disturbance. It relates the operation of the final control element to the measurement information provided by the disturbance-sensing element. On/off control provides only two positions, either full on or full off. There are no intermediate positions. When the controlled variable deviates a predetermined amount from the set point, the final control element moves to either of its extreme positions. The time of travel to on or off is varied according to the load demand.

On/off control is the simplest mode of control, but it has definite disadvantages. It allows the controlled variable to vary over a range instead of letting it settle down to a near-steady condition. If this range becomes too narrow, the controller will rapidly change states, reducing the service life of the controller and the element being controlled.

Multiposition control is an extension of the on/off control to two or more states. When the output range between on to off is too large to achieve the desired response, multiple stages with much smaller ranges can be used. Each stage has only two positions, on or off, but there are as many positions as there are stages, resulting in a step-like operation. The greater the number of stages or steps, the smoother will be the operation. As the demand or load increases, more stages are turned on. Normally, multiposition control provides from two to ten operating stages.

Therefore, the principal object of this invention is to provide a space heater for livestock buildings that is capable of automated variable heat output.

A further object of the invention is to provide a control response as frequently as disturbances occur.

A still further object of the invention is to provide a proportional continuous linear relation between the amount of disturbance, controller action, and position of the final control element.

These and other objects will be apparent to thoses skilled in the art.

SUMMARY OF THE INVENTION

A space heater for the interior of a building has a support enclosure containing a gas burner and a gas conduit connecting the burner to a source of combustible gas. An electronically controlled proportional valve is located in the gas conduit. A fan and motor assembly are in the enclosure for distributing heated air from the burner when gas is communicated through the conduit and to the burner for combustion.

A control system and a PC interface of a PC are located in the support enclosure to receive a data processing card having a predetermined temperature set point relating to temperature conditions within the building. A control means comprises a part of the control system and is connected to the PC to be responsive to temperature sensors in the building to cause or cease ignition of gas at the burner when any of the temperature conditions in the building varied with the predetermined temperature set point to permit the production of heat by the burner to automatically bring the varied temperature conditions in the building back towards the temperature of the predetermined temperature set point.

DESCRIPTION OF THE PREFERRED EMBODIMENT

Figure 1:
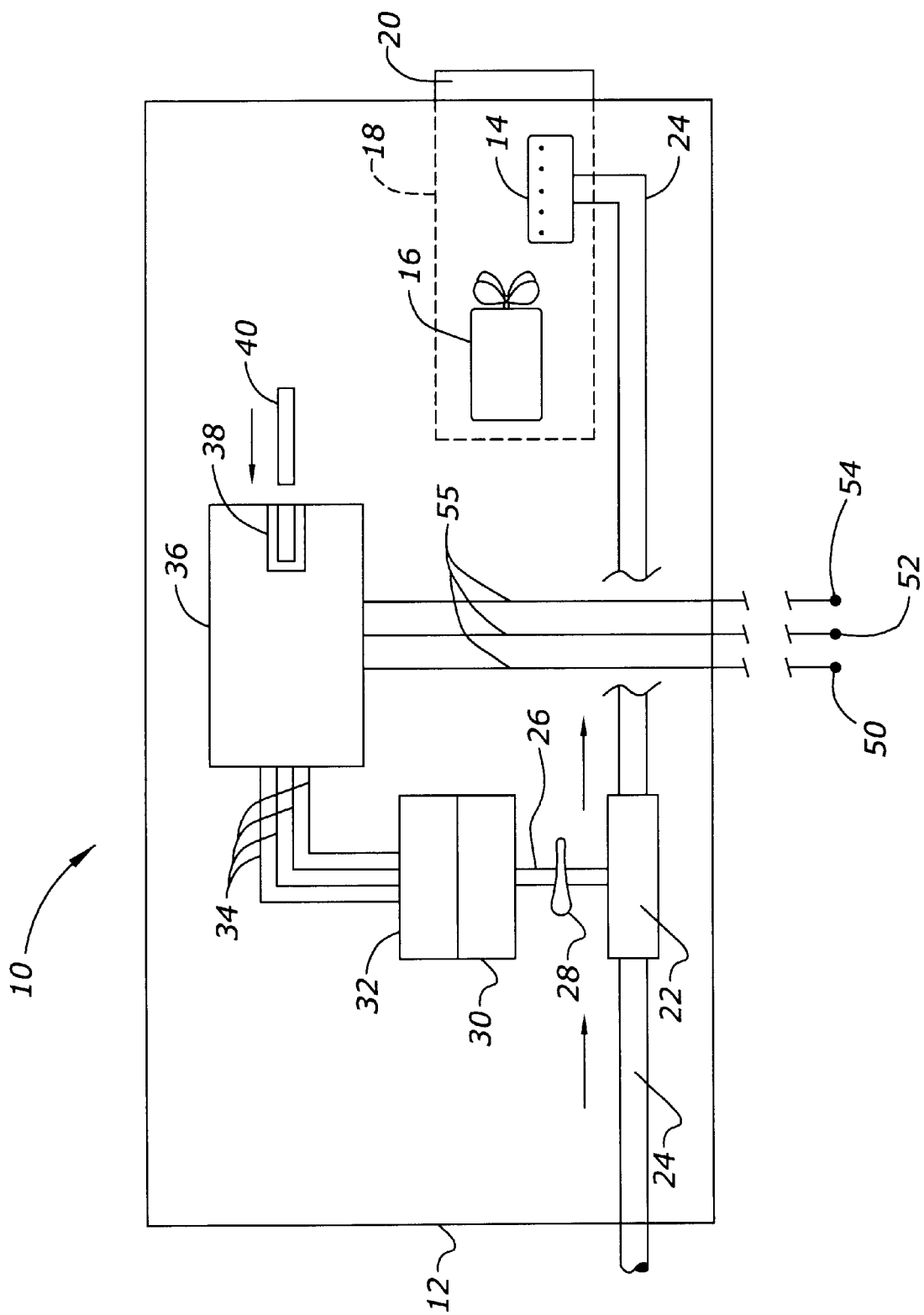
FIG. 1 is a schematic view of the heater unit of this invention.

With reference to FIG. 1, a heater unit 10 has a support enclosure 12. The heater unit 10 is a space heater normally suspended from the ceiling of a building or room. An example of typical space heaters used in livestock facilities is the Model AW100 L. B. White unvented propane gas heater.

A conventional gas burner 14 is located within support enclosure 12 and is associated with a motor and fan assembly 12 mounted within a shroud 18 which is in communication with an outlet port 20 so that the heat generated from combustible gas at the location of the burner 14 can be forced outside of the support enclosure 12 into the space or room which encompasses the heater unit 10.

A proportional valve 22 is imposed in gas conduit 24 which is connected to burner 14 and extends outwardly from the support enclosure 12 to a source of propane gas or the like (not shown). A conventional valve actuating shaft 26 extends upwardly out of valve 22 and has a conventional manually operated control lever 28 extending therefrom. The lever 28 is typically used to control the volume and flow of gas through the valve 22 from a condition of "full on" to a condition of being closed. All of the foregoing structure described above is conventional and is present in existing heater units such as the L. B. White unvented propane gas heater referenced above.

This invention converts the conventional structure described herebefore to an automatic gas heater controlled by a computer and sensors to incrementally open or close the proportional valve 22. This is accomplished by associating with shaft 26 a speed reducer 30 and a stepper motor 32 shown in FIG. 1. The stepper motor 32 is conventionally known in the trade as an MMX stepper motor controller. These components serve to automatically rotate the shaft 26 so as to precisely control the amount of gas flowing through the valve 22. The stepper motor 32 is operationally connected by a plurality of leads 34 to a PC 36 which has a PC interface 38 therein. A data processing card 40 with one or more predetermined temperature set points is insertable in the PC interface so that the PC will "know" the desired temperature set point or points for the building or room in which the heater unit 10 is mounted.

Figure 2:
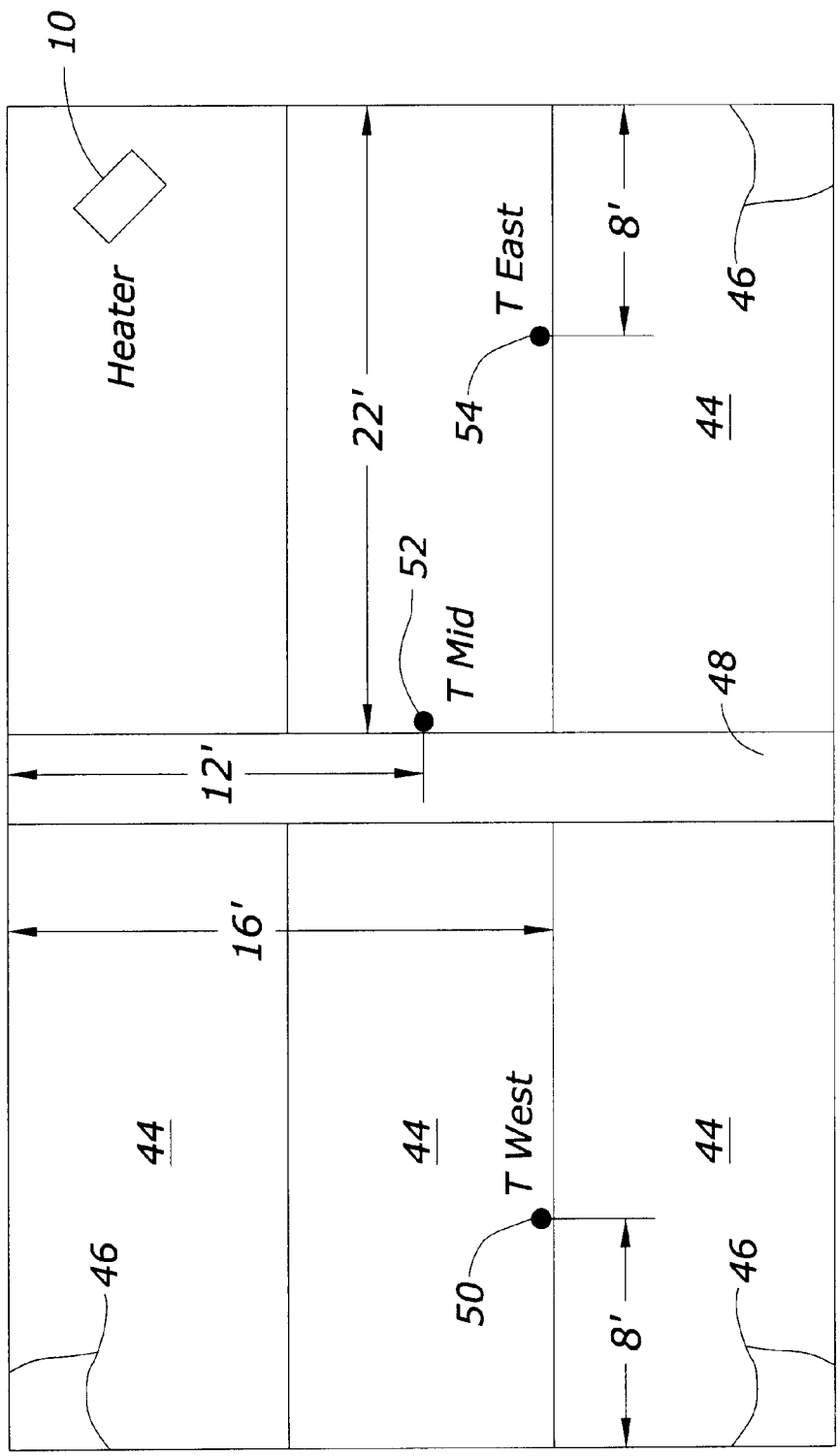
FIG. 2 is a plan view of a livestock building showing the location of the heater and temperature sensors in a livestock building incorporating this invention.
Figure 3:
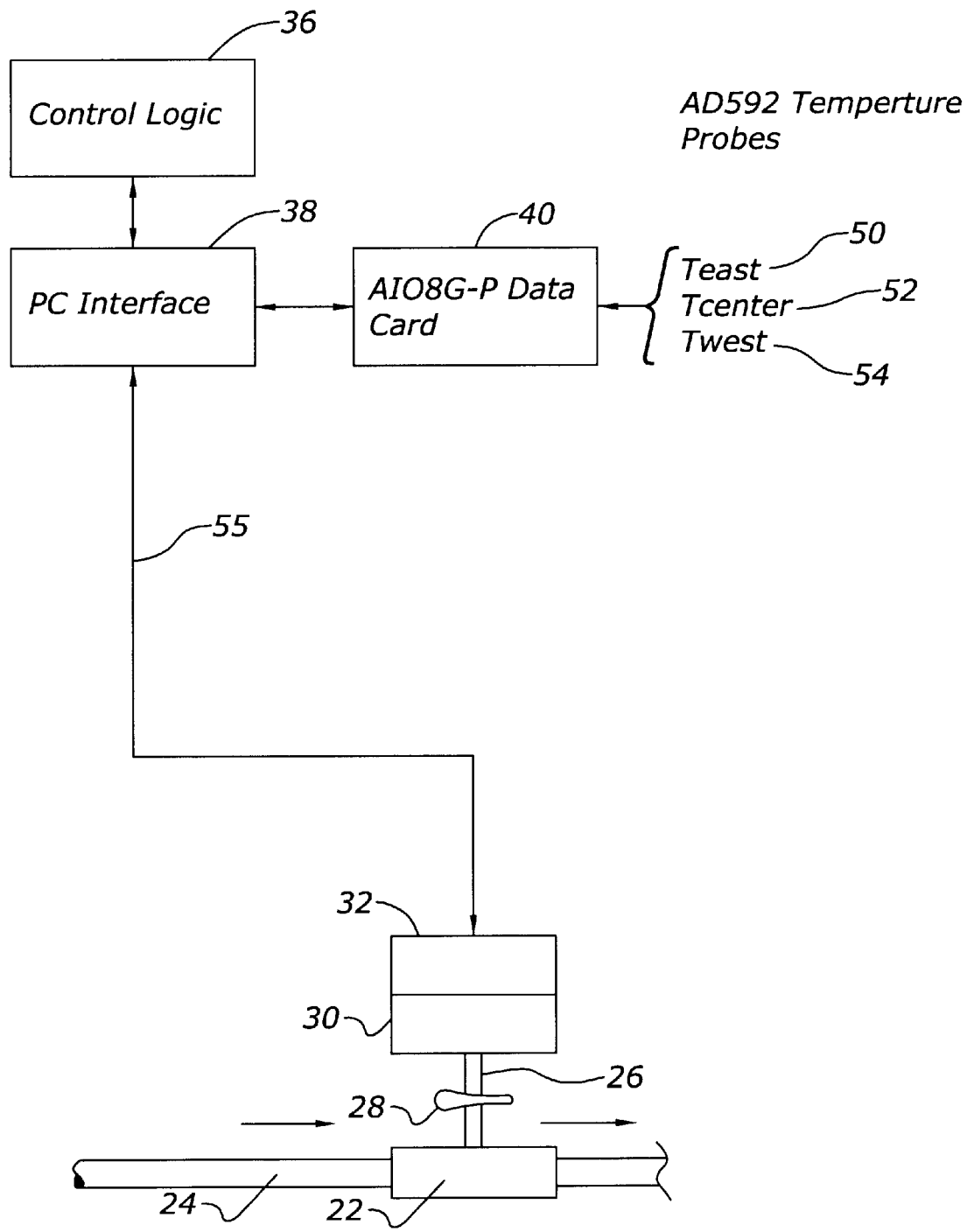
FIG. 3 is a schematic view showing the stepper motor setup and automated control logic.
Figure 4:
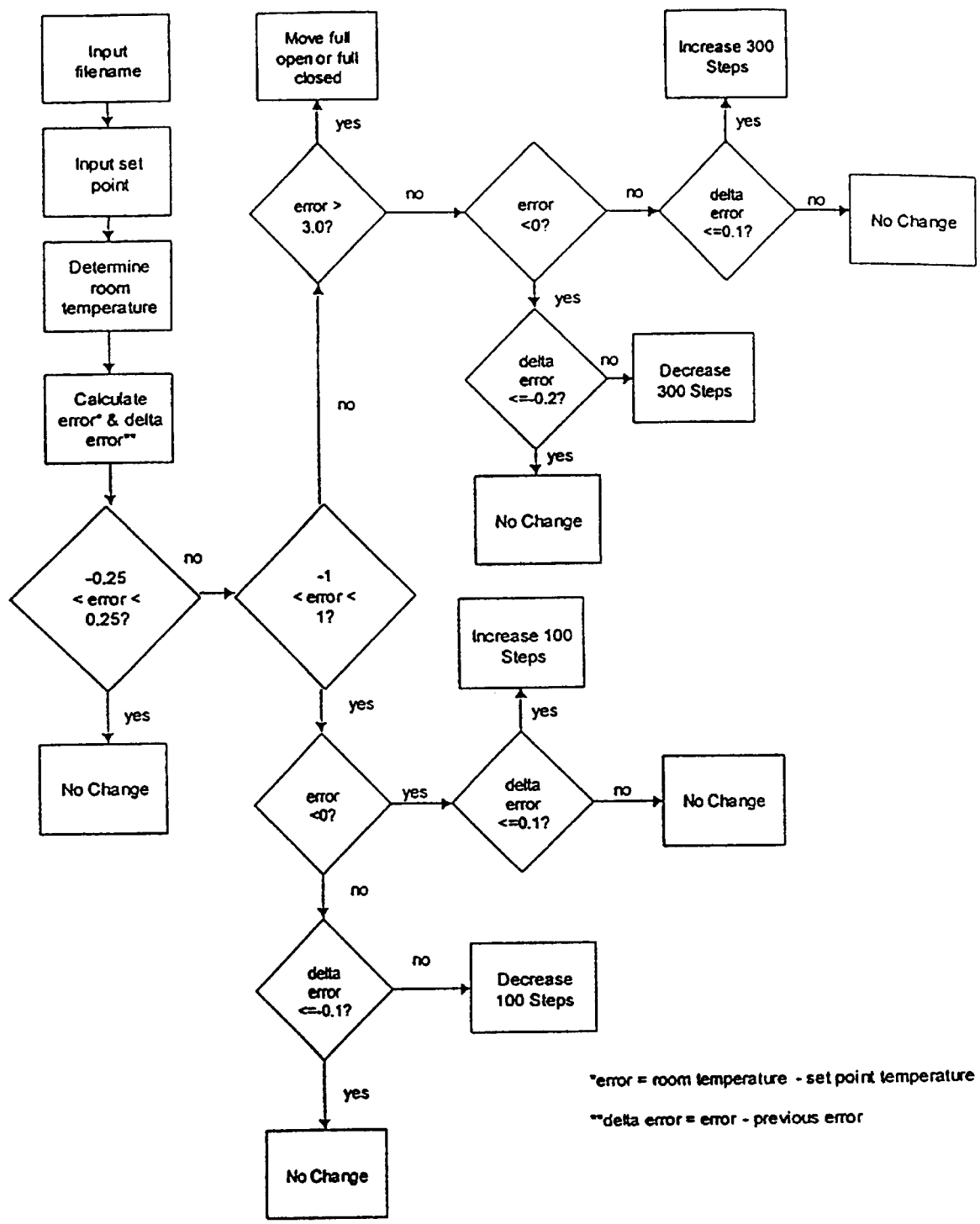
FIG. 4 is a flow chart for the rule-based control logic.

With reference to FIG. 2, a conventional livestock building 42 has a plurality of livestock pens 44, and a continuous perimeter wall 46 extending therearound. A conventional alley 48 extends essentially through the building 42 and is in communication with the pens 44 by a plurality of small gates (not shown). Temperature sensors 50, 52 and 54 are located in the building at spaced intervals and are operationally connected to the PC 36 by leads 55. The above described temperature sensors preferably should be placed about four feet from the floor of the building 42. Such temperature sensors are available from Analog Devices, Inc., Models AD592.

The data processing card 40 is available in the industry and is conventionally identified as an AIO8G-P data card. The stepper motor 32 and speed reducer 30 (a gear box) operationally attached to shaft 26 allows accurate and automated positioning of the valve 22 in 1900 discreet locations over a 90 degree range of motion. This range of motion will adjust the heater from 50,000 to 100,000 BTU's/HR. As should be understood, those 1900 discreet locations achieved by the stepper motor 32 in the speed reducer 30 cannot be accurately achieved by manual operation of the shaft 26 and control lever 28.

As previously indicated the control of heater unit is achieved with the use of the data processing card 40 which typically would be an 8-bit data processing card. When the PC 36 senses from temperature sensors 50, 52 or 54 that the room temperature is above or below the set point on the data processing card, the PC activates the stepper motor 32 to rotate the shaft 26 and to alter the flow of gas through the valve 22 to increase or decrease the amount of heat generated by combustible gases at burner 14. More specifically, the stepper motor 32 is controlled with an MC 2.0 logic board accessed through the data processing card 40. The entire control logic scheme is written in QuickBASIC installed on the PC 36. A full print out of the QuickBASIC code is located in Appendix A. With reference to FIG. 2, the temperature sensors 50, 52 and 54 are identified in the code as Twest, Tmid, and Teast, respectively. Typically, the data acquisition system averages approximately 60 seconds worth of temperature data, collected every second, before making a decision to turn the heater unit 10 on or off, or up or down. A typical phenomenon is for the PC to function when a variation of temperature of 1–3 degrees F. occurs at any of the temperature sensors as compared to the set point temperature determined by data processing card 40.

The typical operation under the system of this invention directs the valve 22 to raise the heater output to full capacity, 100,000 BTU/hr. when the deviation from the set point is more than 1–3 degrees F. as discussed heretofore. The heater 10 in the building raises the temperature of the ambient air about the sensors 50, 52 and 54, and the heater unit 10 will be shut off by the closure of the valve 22 when the ambient air around the sensors is less than the 1–3 degree parameter of the set temperature programmed by the data processing card 40. It has been found that this invention will automatically reduce temperature variability in the pens of a livestock building which are occupied by livestock for a confinement house maintained 50 degrees F. above ambient conditions. It has also been found that the operation of this invention is capable of reducing variation in temperature in the animal occupied zones of the pens without consuming substantially more energy. It is therefore seen that this invention will achieve at least all of its stated objectives.

What is claimed is:

1. A space heater for the interior of a building, comprising,
   a support enclosure,
   a gas burner in the support enclosure,
   a gas conduit connecting the burner to a source of combustible gas,
   an electronically controlled proportional valve in the gas conduit,
   a fan and motor assembly in the enclosure for distributing heated air from the burner when gas is communicated through the conduit and to the burner for combustion,
   a control system and PC interface of a PC associated with the support enclosure to receive a data processing card having a predetermined temperature set point relating to temperature conditions within the building,
   control means in the control system connected to the PC to be responsive to temperature sensors in the building to cause or prevent ignition of gas at the burner when any of the temperature conditions in the building varied with the predetermined temperature set point to permit the production or reduction of heat by the burner to automatically bring the varied temperature conditions in the building back towards the temperature of the predetermined temperature set point.

2. The space heater of claim 1 wherein the control means includes a stepper motor and speed reducer operatively connected to the proportional valve, and operatively connected to the PC so that when temperature sensors in the building detect ambient temperature conditions in the building at variance with the predetermined temperature set point, the stepper motor and speed reducer will cause the proportional valve to adjust the flow of gas to the burner to increase or decrease the amount of heated air generated by gas combusted at the burner.

3. A method for automatically adjusting the amount of heat generated by a space heater in a livestock confinement building, comprising, providing a heating unit in the interior of a livestock building having a plurality of livestock pens, wherein the heating unit has a gas burner connected to a source of combustible gas with an electronically controlled proportional valve in a gas conduit providing gas to the burner, and with a control system and PC interface of a PC capable of receiving a data processing card having a predetermined temperature set point relating to temperature conditions within the building, placing a plurality of temperature sensors in the building in the proximity of at least some of the livestock pens and operatively connecting the temperature sensors to a control means forming a part of the control system, placing a data processing card into operative contact with the PC interface after having imposed on the card information relating to a predetermined temperature for the building;

causing the control system to monitor the temperature sensors to determine variations between the ambient temperature in the buildings adjacent the temperature sensors to be compared with the predetermined temperature imposed on the data processing card, increasing or decreasing the flow of gas to the burner when any of the temperature conditions reflected by the sensors vary with the predetermined temperature set point to permit the production of heat by the burner to automatically bring the varied temperature conditions in the building towards the temperature of the predetermined temperature set point.

4. The method of claim 3 wherein a stepper motor is employed in a proportional valve to permit in excess of one thousand different flow rates of gas to the burner depending upon sensed temperature conditions in the building.

* * * * *